United States Patent [19]
Bossen et al.

[11] Patent Number: 6,108,753
[45] Date of Patent: Aug. 22, 2000

[54] CACHE ERROR RETRY TECHNIQUE

[75] Inventors: Douglas Craig Bossen; Manratha Rajasekharaiah Jaisimha; Avijit Saha; Shih-Hsiung Stephen Tung, all of Austin, Tex.

[73] Assignee: International Business Machines Corporation, Armonk, N.Y.

[21] Appl. No.: 09/052,457

[22] Filed: Mar. 31, 1998

[51] Int. Cl.[7] .................................................. G06F 9/30
[52] U.S. Cl. .......................... 711/118; 714/746; 714/748
[58] Field of Search ................................... 711/146, 119, 711/118; 714/746, 748

[56] References Cited

U.S. PATENT DOCUMENTS

| | | | |
|---|---|---|---|
| 4,535,455 | 8/1985 | Peterson | 714/6 |
| 5,283,876 | 2/1994 | Tague | 711/207 |
| 5,550,988 | 8/1996 | Sarangdhar et al. | 710/133 |
| 5,740,399 | 4/1998 | Mayfield et al. | 711/137 |
| 5,778,438 | 7/1998 | Merchant | 711/146 |
| 5,829,024 | 10/1998 | Sato | 711/122 |
| 5,829,040 | 10/1998 | Son | 711/146 |
| 5,875,469 | 2/1999 | Milling | 711/146 |

OTHER PUBLICATIONS

Hardware–based Methods for Maintaining Cache Coherency in a Multiprocessor System, Julie Jones and Roger L. Haggard, IEEE data base.

Speculation Techniques for improving Load related Instruction scheduling, Adi Yoaz, Mattan Erez, Ronny Ronen, and Stephan Jourdan, IEEE database.

*Primary Examiner*—Eddie P. Chan
*Assistant Examiner*—Jan S. Williams, II
*Attorney, Agent, or Firm*—Robert V. Wilder; Volel Emile

[57] ABSTRACT

A method and apparatus is provided for enhanced error correction processing through a retry mechanism. When an L1 cache instruction line error is detected, either by a parity error detection process or by an ECC (error correcting code) or other process, the disclosed methodology will schedule an automatic retry of the event that caused the line error without re-booting the entire system. Thereafter, if the error remains present after a predetermined number of retries to load the requested data from L1 cache, then a second level of corrective action is undertaken. The second level corrective action includes accessing an alternate memory location, such as the L2 cache for example. If the state of the requested cache line is exclusive or shared, then an artificial L1 miss is generated for use in enabling an L2 access for the requested cache line. If the requested cache line still does not load from the L2 cache, the second level corrective methodology, after a selective number of retries, terminates and a machine check is generated to initiate a more extensive corrective or recovery action procedure. In an exemplary embodiment, a mechanism is illustrated for recovery from transient errors in an L1 cache load operation although the disclosed methodology may also be implemented partially or entirely in software and in any parity or other error detecting application.

8 Claims, 2 Drawing Sheets

CACHE ERROR RETRY TECHNIQUE

RELATED APPLICATIONS

The present application is related to co-pending applications entitled "RECOVERY MECHANISM FOR L1 DATA CACHE PARITY ERRORS", Attorney Docket AT9-97-372, filed on, assigned to the assignee of the present application and included herein by reference.

FIELD OF THE INVENTION

The present invention relates generally to information processing systems and more particularly to an improved methodology for enabling fast recovery of computer systems from transient errors.

BACKGROUND OF THE INVENTION

As the number of devices in a very large scale integrated (VLSI) circuit chip increases, the individual transistor devices which form its component elementary logic circuits, occupy areas of the chip on the order of a few square microns or less. The quantity of charge which is transferred between field effect transistor devices of that size while carrying out normal switching operations is such that the circuits are very susceptible to electrostatic and even radiation-induced perturbations. In many systems such perturbations, even when they are only transient in nature, may cause or trigger large scale error-correcting processes to be initiated, such as system re-booting. Such error correcting processes, in turn, may cause unnecessary processing delays especially in the case of transient errors, where by the time the system has been re-booted, a transient error has been long gone.

Computer systems may be protected from faults by using parity error protection or error correcting code (ECC) techniques. A double error detection ECC will detect and correct all single bit errors, including transient and "stuck-at" faults, as well as all two-bit errors. However, ECC is quite expensive since even for a single error correcting code, a large number of bits will be required. Parity techniques on the other hand are relatively inexpensive but can serve for error detection only. As chip densities increase and newer technologies are implemented, it is expected that the occurrence of transient errors will increase.

Thus there is a need for a method and apparatus which is cost effective and which includes improved immunity to transient errors thereby allowing continued data processing operations with only minimal modification to accommodate the error checking function while minimizing unnecessary recycling in response to transient errors.

SUMMARY OF THE INVENTION

A method and apparatus is provided for enhanced memory access error correction processing through a retry mechanism. The methodology includes comparing a first address contained in a first memory request with addresses contained in a first memory unit. When a first match between the first address and the addresses contained in the first memory unit is detected, a first memory unit hit signal representative of the first match is provided. If an error condition is also detected with the first memory unit hit signal, a first memory unit miss signal is artificially generated and used to effect a comparison between the first address with addresses contained in a second memory unit, and data is read from the second memory unit if there is a second memory unit hit detected. In an exemplary embodiment, a mechanism is illustrated for recovery of data from L2 after detecting a co-existence of an L1 hit and an L1 error condition. The disclosed methodology may be implemented partially or entirely in software and may be used in any parity or other error detecting application.

BRIEF DESCRIPTION OF THE DRAWINGS

A better understanding of the present invention can be obtained when the following detailed description of a preferred embodiment is considered in conjunction with the following drawings, in which.

DETAILED DESCRIPTION

Figure 1:
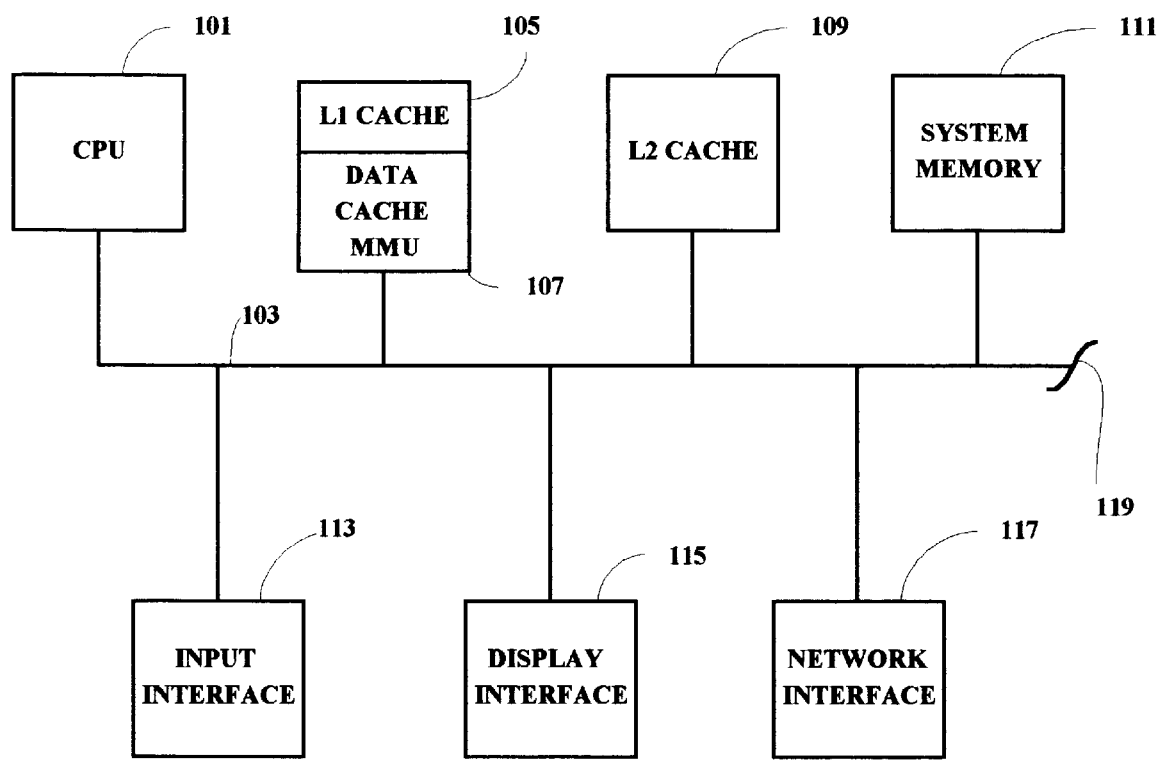
FIG. 1 is a block diagram of a portion of an exemplary computer system in which the present invention may be implemented.

With reference to FIG. 1, the various methods discussed herein may be implemented within a typical computer system including a CPU unit 101 which is coupled to a main system bus 103. The exemplary system also shows an L1 data cache unit 105 including a data cache memory management unit 107, both coupled to the system bus 103. An L2 cache unit 109 and a system memory 111 are also connected to the system bus 103. The system is arranged to have all of the typical connections to other computer system devices such as display devices 115, network connections 117 and input connections 113, and arrangements for bus connections 119 to other bus interface circuits and network connections.

The disclosed logic and methodology may be implemented in a hardware configuration or in a software implementation. The error detecting and correcting methodology may also be implemented partially in software and partially in hardware. Since the workstation or computer system within which the present invention is implemented is, for the most part, generally known in the art and composed of electronic components and circuits which are also generally known to those skilled in the art, circuit details beyond those shown in FIG. 1, will not be explained to any greater extent than that considered necessary as illustrated above, for the understanding and appreciation of the underlying concepts of the present invention and in order not to obfuscate or distract from the teachings of the present invention.

As hereinbefore discussed, error detecting techniques such as parity error detecting techniques or ECC (error correcting code) techniques, can detect errors to a limited extent. However, an error detection in many cases will cause a system re-boot and if the error was caused by a transient and inconsequential condition, much processing time is lost while the system cycles for the detected error. Parity protection, for example, can be enhanced by providing correction capabilities through a retry mechanism. When a parity error is detected, the methodology will schedule an automatic predetermined number of retries of the instruction that caused the parity error without re-booting the entire system. Ideally, when a failed load instruction is retried, the cause of the transient error is no longer present and the load instruction, for example, will be processed normally on one of the retries without requiring a system reboot.

If, however, the cause of the detected error remains present after a predetermined number of retries to the L1 cache, and the load instruction continues to fail to execute, then a second level of corrective action is undertaken before issuing a machine check and reboot. In the present example, the second level of corrective action is embodied in a call to the L2 cache for the requested data. If the data requested first of the L1 cache is also in the L2 cache, and the state of the L2 cache line is appropriate, i.e. either a "shared" or an "exclusive" MESI ("modified", "exclusive", "shared" or "invalid") state, then an attempt is made to load the data from the L2 entry. Again, the L2 retrieve can be attempted a predetermined number of times and if an error condition continues to be detected, then the error condition can be reported in a normal manner for appropriate corrective action including a system reboot.

The multi-level corrective action methodology can also be implemented where instructions fail to process for any reason, and that failure can be detected by any means. Moreover, the methodology may include more than the two-step approach discussed above. For example, in systems where additional cache levels are implemented, the retry technique would also apply with as many corrective levels as there may be cache levels, and with each corrective level including a different number of retries before advancing to the next level. In the present example, after a predetermined number of load retries has proven unsuccessful at the fist level with the L1 cache, another predetermined number of retries is made to retrieve the requested data from the L2 cache. The "predetermined number" at each level may be the same number or the number of retries may be different, depending upon the application.

Caches are faster and the more expensive memory units in modern systems are organized in cache hierarchies which may include, for example, at least two or more cache levels which are designated numerically such as L1, L2, etc. Additional cache levels may also be included. In the present disclosure, L1 cache is the fastest cache in the system but also the smallest. Similarly, L2 may not be as fast as L1 but L2 would be larger and would be able to contain more information. Individual caches are organized in groups of bytes called "lines" and some dynamic information is also associated with each "line". For example, cache lines in the example include a "state" bit or field which designates the "state" of the cache line. Generally the particular states are determined in accordance with a cache coherence protocol. The state of a cache line refers to the nature of the particular presence of the cache line. The "state" is a dynamic parameter since it may change as data processing applications are run and the location and duplication of the cache line changes.

In an exemplary cache consistency protocol, there are at least four possible "states" for cache lines and they are designated "MESI" states. The particular state of a cache line at any given time is indicated by a "state" field or bit associated with the cache line. The acronym "MESI" refers to four possible states of cache lines which include "modified", "exclusive", "shared" and "invalid". There may also be other states in other cache coherency protocol schemes. The state of a cache line indicates the number of locations or number of copies of the cache line in question are present at a given time. For example, a cache line may only exist at one particular cache location at a given time and in that event, the "state" of that cache line would be designated as "exclusive". Any changes made to an "exclusive" cache line would not have to be replicated at other addresses to maintain coherency since the data existed only at the one exclusive cache address. The "shared" state means that the cache line is "shared" by a plurality of locations and may be acquired from any of the shared locations. For example, an L1 cache line may be "shared" if the data contained at that address is also contained at an L2 cache associated with the same processor, or if the data is also present within an L2 cache of another processor cache arrangement in a multi-processor system.

In the present example, for purposes of illustration, it is assumed a load instruction has returned a "hit" from an L1 cache but an error condition has been detected. It is further assumed that a cache coherence protocol is implemented and the protocol is effective to maintain the MESI states. Other schemes are also possible. In the example, the system includes a counter that keeps track of the number of times that an instruction "in error" has been retried. In the pseudocode presented herein, the term "mmu0_du_hit" means that requested data was present in L1 and an error was detected while trying to retrieve or load the data. It is also assumed in the example that all of the lines in L1 are also in L2. However the L1 can have the cache line in a different MESI state than in the L2. One of many possible exemplary pseudocode listings which may be implemented to accomplish the error retry methodology herein disclosed is presented below.

Logic for Retry Mechanism

```
if parity_error_L1_cache & load & mmu0_du_hit {
    if not_next_to_complete
        {
            wait in Q till next_to_complete
            turn "to be retried" bit on; /*this marks the
            instruction such that another attempt will be made by
            the hardware to retrieve the data from the L1 cache*/
        }/*end: not next_to_complete*/
    else if next_to_complete {
        if (retry_count=0) {
            turn on miss_retry; /*this will force the
            hardware to make a second attempt to retrieve
            the data*/
            count=count+1; /*mark that it was retried*/
        }/*end: count=0*/
        else if (count=1) { /*i.e. tried from L1 before*/
            if (state of line in cache is exclusive or shared) {
                retry load; /*faking an L1 cache miss and is
                therefore loaded from L2*/
            }/*end: exclusive or shared*/
            if (modified)
                report machine check parity error to IFU
        }/*end: else count=1*/
    }/*end: next_to_complete*/
}/*end: parity_error_L1_cache & load & mmu0_du_hit*/
else
    normal load operation.
```

In the above listing, "next_to_complete" means that all previous instructions have been completed. "Q" refers to the queue in the DU (data unit) which holds all instructions until they are finished from the data unit. "Retry" means to retry a designated instruction when that instruction is next to complete. "Miss_retry" means to retry a designated instruction in a predetermined number of cycles (typically three cycles). Also, an assumption is made that the parity error is calculated a cycle after the address generation.

Figure 2:
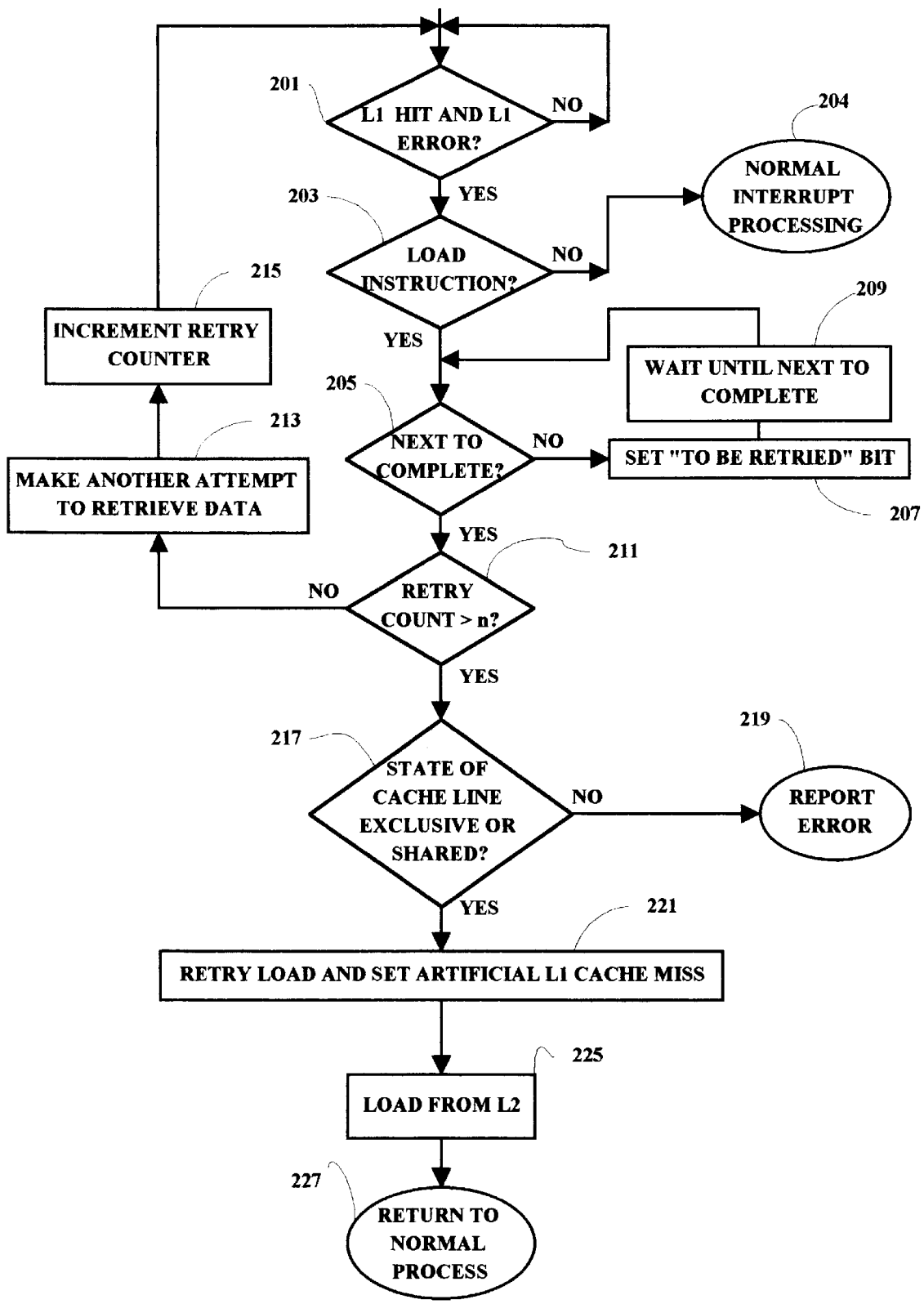
FIG. 2 is a simplified flow chart illustrating the basic functional flow implemented with the present invention.

Referring to FIG. 2, the above pseudocode is shown in a flowchart format. When an L1 hit and an L1 error are detected 201, a determination is made 203 as to whether or not the instruction was a "load" instruction. If not, the process reports the error and further processing will be continued in accordance with normal system processing for the interrupt. However, if the hit and error condition occurs on a load instruction 203, a determination is made as to whether the instruction is the next instruction to complete 205. This step is taken to maintain the proper ordering of instructions. If the instruction is not next to complete, a "to be retried" bit is set 207, and the process waits 209 until the instruction is next to complete. When the instruction is next to complete, a retry counter is checked 211. The methodology will continue to retry to retrieve the data 213 and increment a retry counter 215 until a predetermined number "n" of retries has been exceeded. This number will vary depending upon the design of the system and the application. After "n" retries 211, a check is made to determine if the "state" of the cache line is "exclusive" or "shared". The "state" of the cache line is indicated by one or a group of bits in the cache line. In block 217, a check is made to determine that the cache line being retrieved has either a "shared" or an "exclusive" state, and that the cache line is not "invalid" or has not been "modified". If the cache line is not either exclusive or shared then the error or interrupt is reported in accordance with normal system processing. If, however, the cache line in step 217 is either exclusive or shared, then the load instruction is retried 221 but at this point, the retry step 221 also includes an artificial setting of an L1 cache "miss" (even though the requested cache line is actually in L1) so that the process responds as if there is a miss indication from the L1 cache. In that case when the artificial "L1 miss" is detected, the process will load 225 the cache line from L2, and the process will return to normal operation 227 having retried the load instruction with a successful return without the need for a system reboot to overcome a transient error. If there is an L2 error, the process may also include several more retries, as was done with L1, to make sure the L2 error is not only a transient before reporting the error condition. Thus, the disclosed methodology is effective on an L1 error interrupt condition, to first retry the instruction without a system reboot, and if that process is not fruitful, to load from L2 for the requested data. Only if the requested data cannot be returned from the L1 cache or the L2 cache after the described retry processing, is the system reboot or other operating system interrupt routine called for execution.

The present exemplary embodiment illustrates a simple hardware mechanism for recovery from transient errors which may be generated in an L1 cache although the disclosed methodology may also be implemented partially or entirely in software and in any error checking application including parity error checking and ECC routines. The disclosed methodology is effective to provide a degree of immunity for a cache management system to transient errors which would heretofore have caused the system to report an interrupt and initiate a relatively lengthy corrective processing routine.

The method and apparatus of the present invention has been described in connection with a preferred embodiment as disclosed herein. Although an embodiment of the present invention has been shown and described in detail herein, along with certain variants thereof, many other varied embodiments that incorporate the teachings of the invention may be easily constructed by those skilled in the art, and even included or integrated into a processor or CPU or other larger system integrated circuit or chip. The methodology may also be implemented solely in program code stored on a CD, disk or diskette (portable or fixed), or other memory or storage device, from which it may be executed to function as described herein. Accordingly, the present invention is not intended to be limited to the specific form set forth herein, but on the contrary, it is intended to cover such alternatives, modifications, and equivalents, as can be reasonably included within the spirit and scope of the invention.

What is claimed is:

1. A method for processing a memory request, said method comprising:

comparing a first address contained in a first memory request with addresses contained in a first memory unit;

detecting a match between said first address and said addresses contained in said first memory unit;

generating a first memory hit signal representative of said match in said first memory unit;

detecting an error condition associated with said first memory request;

determining that said first memory request is associated with a load instruction and is the next instruction to complete;

retrying processing of said first memory request to said first memory unit in response to a detection of said match and said error condition continuing said retrying for up to a first predetermined number of time if said error condition continues.

2. The method as set forth in claim 1 and further including:

generating a first memory miss signal when said error condition remains after said step of retrying;

replacing said first memory hit signal with said first memory miss signal;

comparing said first address with addresses contained in a second memory unit; and reading a memory line from said first address in said second memory unit if a match is detected between said first address and addresses contained in said second memory unit.

3. A method for processing a memory request, said method comprising:

comparing a first address contained in a first memory request with addresses contained in a first memory unit;

detecting a first match between said first address and said addresses contained in said first memory unit;

generating a first memory unit hit signal representative of said first match;

detecting an error condition associated with said first memory unit;

determining that said first memory request is associated with a load instruction;

generating a first memory unit miss signal in response to a coincidence of said first memory unit hit signal and said error condition;

using said first memory unit miss signal to effect a comparison between said first address with addresses contained in a second memory unit; and reading data from said first address in said second memory unit if a match is detected between said first address and addresses contained in said second memory unit.

4. The method as set forth in claim 3 wherein said first memory unit is an L1 cache unit.

5. The method as set forth in claim 4 wherein said second memory unit is an L2 cache unit.

6. A storage medium including machine readable indicia, said storage medium being selectively coupled to a reading device, said reading device being selectively coupled to processing circuitry within a processing system, said reading device being selectively operable to read said machine readable indicia and provide program signals representative thereof, said program signals being effective for:

comparing a first address contained in a first memory request with addresses contained in a first memory unit;

detecting a match between said first address and said addresses contained in said first memory unit;

generating a first memory hit signal representative of said match in said first memory unit;

detecting an error condition associated with said first memory request;

determining that said first memory request is associated with a load instruction is the next instruction to complete;

retrying processing of said first address request to said first memory unit in response to a detection of said match and said error condition.

7. A storage medium including machine readable indicia, said storage medium being selectively coupled to a reading device, said reading device being selectively coupled to processing circuitry within a processing system, said reading device being selectively operable to read said machine readable indicia and provide program signals representative thereof, said program signals being effective for:

comparing a first address contained in a first memory request with addresses contained in a first memory unit;

detecting a first match between said first address and said addresses contained in said first memory unit;

generating a first memory unit hit signal representative of said first match;

detecting an error condition associated with said first memory unit;

determining that said first memory request is associated with a load instruction;

generating a first memory unit miss signal in response to a coincidence of said first memory unit hit signal and said error condition;

using said first memory unit miss signal to effect a comparison between said first address with addresses contained in a second memory unit; and reading data from said first address in said second memory unit if a match is detected between said first address and addresses contained in said second memory unit.

8. An information processing system comprising:

a processing device;

a plurality of memory units coupled to said processing device; and logic means connected to said processing device and said plurality of said memory units, said processing device and said logic means being selectively operable for:

comparing a first address contained in a first memory request with addresses contained in a first of said memory units;

detecting a first match between said first address and said addresses contained in said first memory unit;

generating a first memory unit hit signal representative of said first match;

detecting an error condition associated with said first memory unit;

determining that said first memory request is associated with a load instruction;

generating a first memory unit miss signal in response to a co-existence of said first memory unit hit signal and said error condition;

using said first memory unit miss signal to effect a comparison between said first address with addresses contained in a second memory unit and reading data from said first address in said second memory unit if a match is detected between said first address and addresses contained in said second memory unit.

* * * * *